United States Patent [19]

Hiramatsu

[11] Patent Number: 5,012,883
[45] Date of Patent: May 7, 1991

[54] AIR DUCT DEVICE FOR A MOTORCYCLE

[75] Inventor: Kinuo Hiramatsu, Kawagoe, Japan

[73] Assignee: Honda Giken Kogyo Kabushiki Kaisha, Tokyo, Japan

[21] Appl. No.: 325,167

[22] Filed: Mar. 17, 1989

[30] Foreign Application Priority Data

Mar. 20, 1988 [JP] Japan .............................. 63-36931[U]
Jun. 28, 1988 [JP] Japan .............................. 63-157938

[51] Int. Cl.$^5$ ........................ B62M 7/00; B62D 61/02
[52] U.S. Cl. .................................. 180/225; 180/219; 280/281.1
[58] Field of Search .................... 280/281.1, 283, 274; 180/219, 225

[56] References Cited

U.S. PATENT DOCUMENTS 4,226,296 10/1980 Higaki ..................... 280/281.1 X
4,597,466 7/1986 Yamada .............................. 180/225
4,690,236 9/1987 Shinozaki et al. .............. 180/225 X Primary Examiner—Charles A. Marmor
Assistant Examiner—Alan M. Kager
Attorney, Agent, or Firm—Armstrong, Nikaido, Marmelstein, Kubovcik & Murray

[57] ABSTRACT

An air intake structure for a motorcycle includes a pair of hollow laterally spaced frames extending from a headpipe to a rear portion of the motorcycle, a hollow cross member connecting the frames together at an intermediate portion thereof, wherein the hollow interior of the cross member communicates with the hollow interiors of the frames. Intake openings are provided at a front portion of the frames for feeding air into the frames, while an exhaust opening is formed on the bottom of the cross member for exhausting air downward to the engine air intakes. A fuel tank cover is provided to cover a flexible fuel tank disposed between the laterally spaced hollow frames. The fuel tank cover includes a hollow fairing stay formed integrally therewith for supporting a motorcycle fairing, wherein the hollow fairing stay forms an air duct for directing air from an air inlet in the fairing to the intake openings of the frame.

14 Claims, 9 Drawing Sheets

AIR DUCT DEVICE FOR A MOTORCYCLE

BACKGROUND OF THE INVENTION

The present invention relates to an air ducting apparatus for ducting air through a fairing of a motorcycle and into the interior space of the motorcycle frame. More particularly the present invention is directed to an air ducting apparatus which also serves as a fairing stay for supporting the motorcycle fairing. The construction of the frame body of the motorcycle also affects the ducting of air to the engine. Additionally, the frame structure enables the use of a flexible fuel tank and directing of coolant fluid.

There is generally provided an air duct at the front side of an intake system of a motorcycle, which can effectively take an atmosphere in, e.g. there is provided a hollow fairing stay between a fairing covering the front portion of the frame and a frame body. This is shown in Japan Utility Model Application 85-665594.

It is necessary to provide fairing stays in the above-mentioned construction. To make fairing stays integral with other parts serves to simplify body construction and thus improve the efficiency of the assembly process. An important object of the present invention is to provide an air duct and a fairing stay which are both formed integrally with another part of the motorcycle.

SUMMARY OF THE INVENTION

The above object is solved by forming a fuel tank cover having a hollow fairing stay formed integrally therewith. The fairing stay extends from the main portion of the fuel tank cover and at a remote end thereof the fairing stay supports the fairing. Because the fairing stay is hollow, it can also serve as an air duct for directing air entering through an intake port in the fairing to the interior space of the frame body.

The fuel tank cover including the fairing stay formed integrally therewith function together to provide the necessary support for a fairing so that a separate fairing stay is not required as in the prior art. Therefore, in addition to its function as a fuel tank cover, the fuel tank cover also functions as a fairing stay and an air duct, in order to simplify construction and thus improve the efficiency of frame assembly.

The frame body is constructed by upper and lower pipes with side panels welding the two together. Because of the inherent strength of such a structure, square pipes having a smaller width can be used, thus resulting in smaller frontal area to improve performance of the motorcycle. Additionally, the smaller width of the frame body gives the operator a lighter more comfortable knee grip.

A resilient fuel tank is provided within the frame structure. The positioning of the fuel tank within the frame structure enables that space to be more efficiently used. A further result of the above is that the tank cover may be made compact because most of the fuel tank is positioned between the frame and thus only a small portion of it extends above the frame. Because the tank is made of a resilient material, it has need to be supported. The tank of this invention has a plurality of grooves which are supported by the top frame, and inclined plate, and the lower frame. Thus there is no load concentration, and the resilient fuel tank may be properly supported. Further, because the fuel tank is supported by the inclined plate, this prevents the shifting of the fuel tank backwards and forwards.

BRIEF DESCRIPTION OF THE DRAWINGS

The advantages of the invention will become apparent in the following description taken in conjunction with the drawings, wherein.

DETAILED DESCRIPTION OF THE PREFERRED EMBODIMENTS

Figure 1:
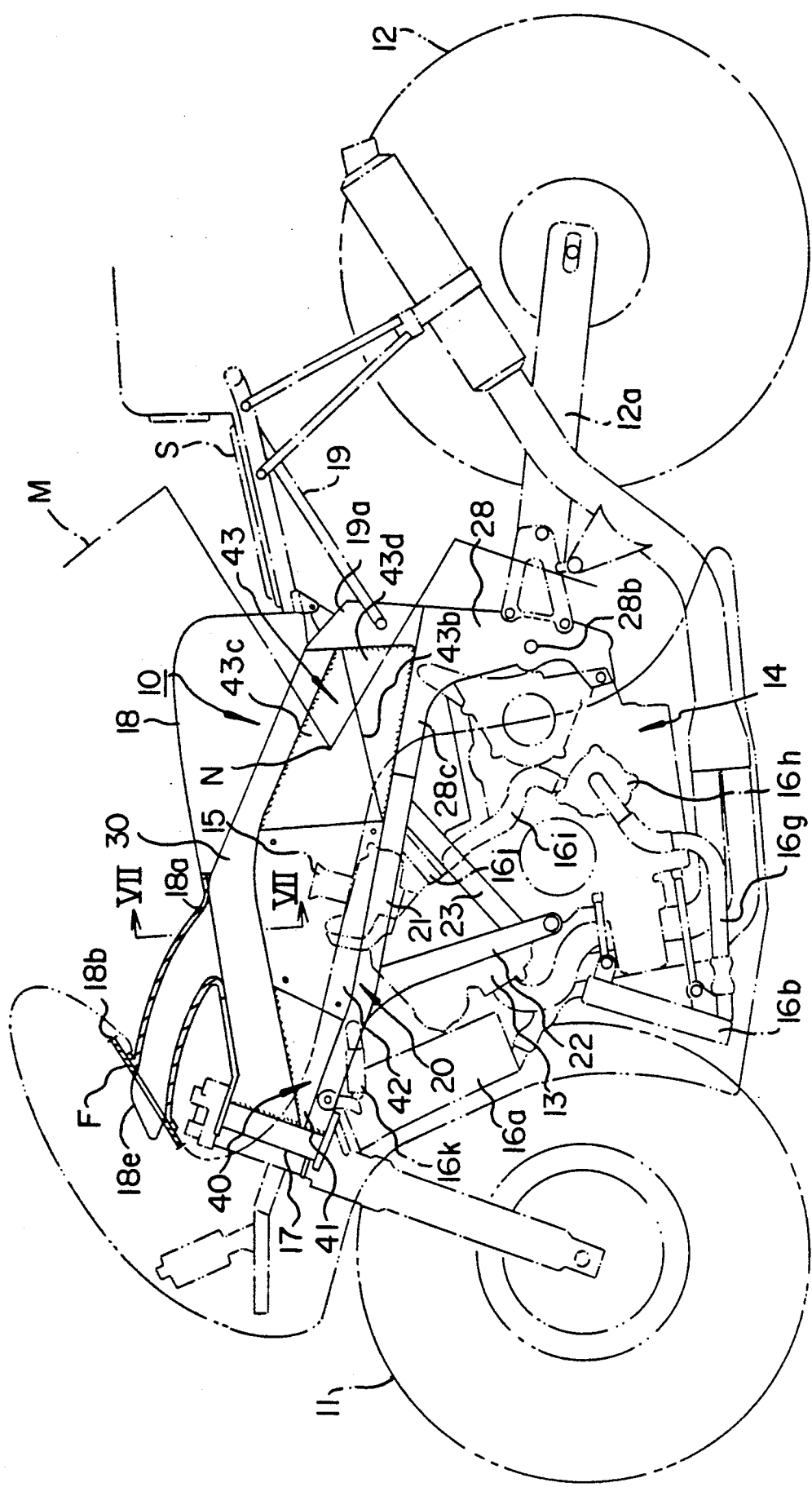
FIG. 1 is a pass-through side view of the motorcycle frame body.
Figure 2:
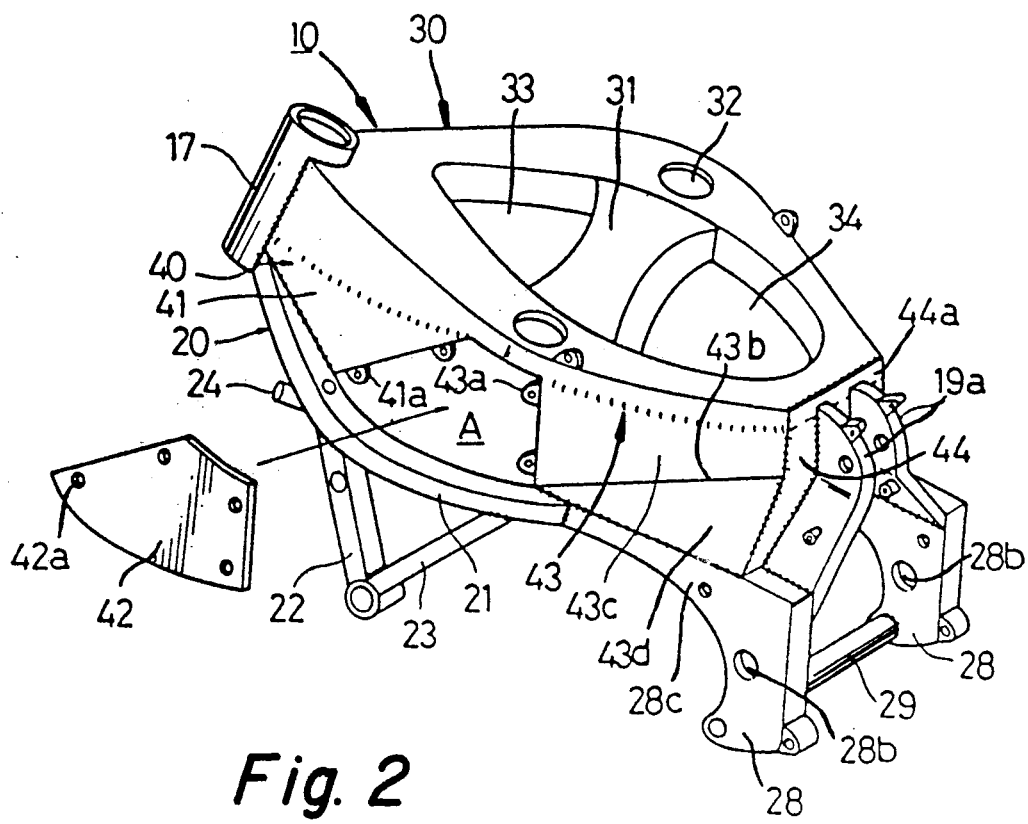
FIG. 2 is a partially exploded view of a motorcycle frame.
Figure 3:
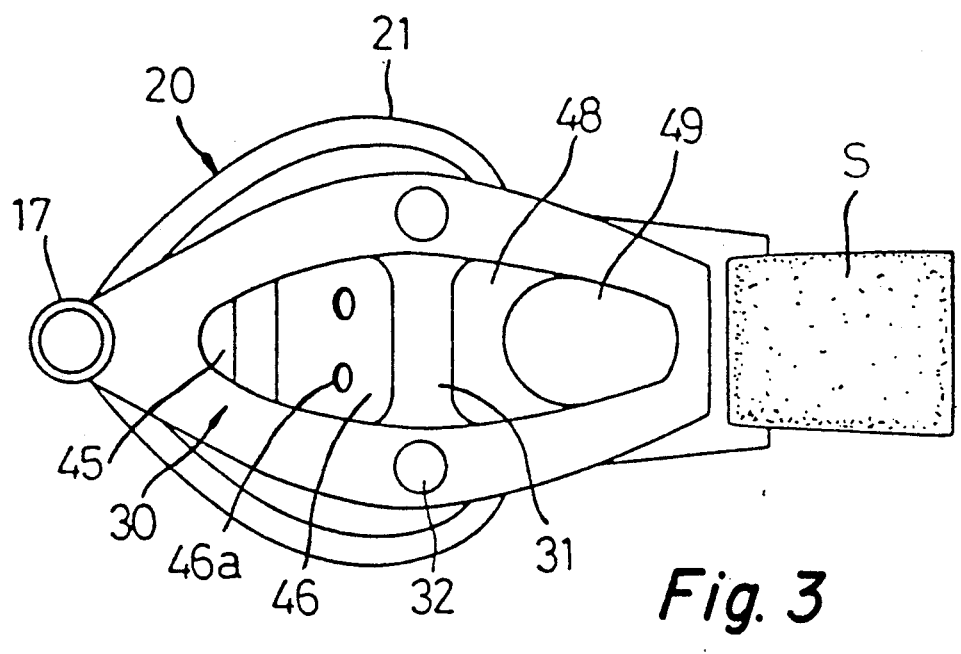
FIG. 3 is a top view of a motorcycle frame body.

FIG. 1 is a side view of a motorcycle, while FIGS. 2 and 3 show views of the motorcycle frame. As shown in FIG. 1 a front wheel 11 and a rear wheel 12 are respectively supported by the motorcycle suspension at the front portion and the rear portion of a frame body 10.

An in-line four cylinder engine 14 with forwardly inclining cylinders 13 is supported at the central lower portion of the frame body 10.

An intake apparatus 15 including a carburetor or the like is connected to the forwardly inclining cylinders 13 and the upper portion of the intake apparatus 15 is housed within the inner portion of the frame body 10.

A main radiator 16a and an auxiliary radiator 16b (such as an additional coolant radiator, an oil cooler, or the like) are disposed above and below at the forward side of the four cylinder engine 14. Numeral 17 is a head pipe, numeral 18 is a tank cover and numeral 19 is a seat rail. A seat S is supported on seat rail 19.

Figure 6:
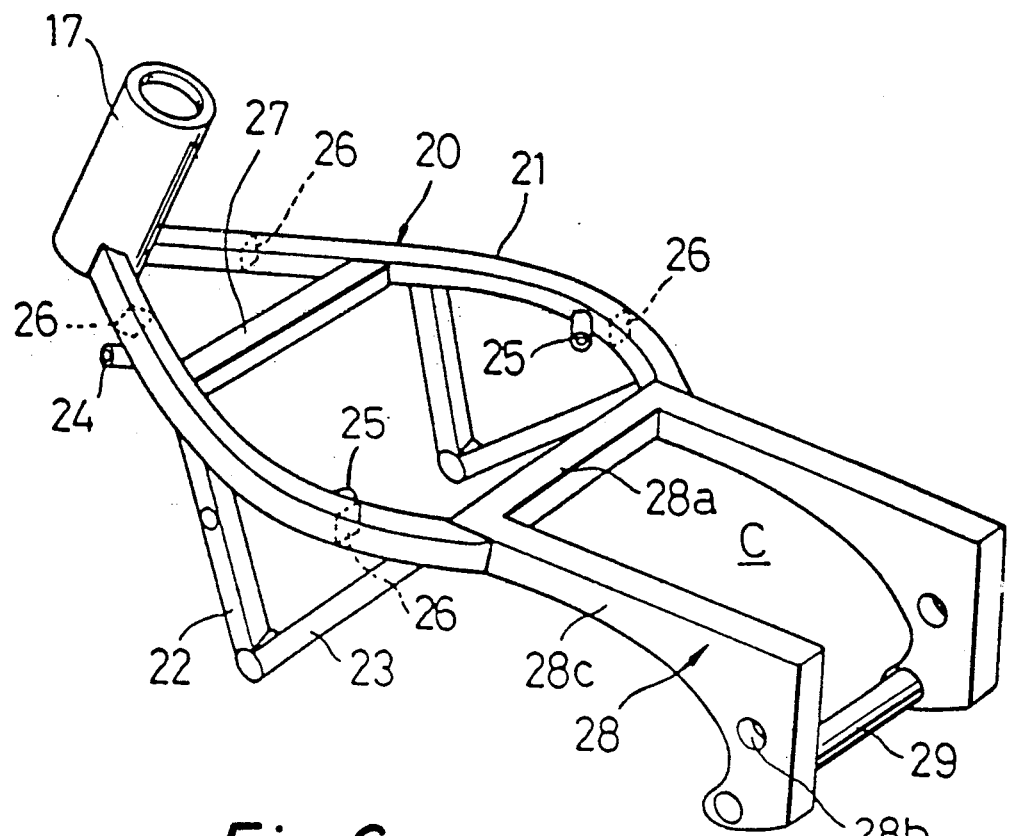
FIG. 6 is a perspective view of a lower portion of a motorcycle frame.

As shown in FIG. 2 and FIG. 3, the frame body 10 consists of an upper frame 30, and a lower frame 20 (see also FIGS. 3 and 6). A plate 40 covers the side portions of the upper frame 30 and the lower frame 20. Upper frame 30 and lower frame 20 each extends rearwardly from the head pipe 17 and consists of a pair of right and left upper and lower frames which are made of aluminum alloy square pipe element. The lower frame 20 inclines downwardly from the lower portion of the head pipe 17 beyond the side portion of the intake apparatus 15 and forms a large outwardly curved portion 21. Under the curved portion 21 there is a triangular truss structure formed by connecting each tip of down pipes 22 and 23 which is a supporting portion for engine 14.

The lower frame body 10 (see FIG. 6) has a coolant outlet portion 24 projecting from the frame at the forward portion of the left lower frame 20 and coolant inlet 25 projecting from the frame at the rear portions of the right and the left curved portions 21. Separating walls 26 are provided at the front portion of the outlet 24 and at the rear portion of the inlet 25 of the lower frame 20. The coolant passage is formed from the right and the left inlets 25 to the outlet 24 in the left side by a cross-pipe 27 which connects the right and left lower frames 20.

The lower frame 20 is welded to a pivot plate 28 at the rear portion of the curved portion 21. The pivot plate 28 has a cross portion 28a at the front portion thereof to form a U-shape from a top view. Referring to FIG. 1, the front portion of the swing arm 12a for the rear wheel 12 is pivoted at the pivot portion 28b. The lower portions between the right and the left pivot plates 28 are reinforced by a cross pipe 29. Pivot plate 28 can be formed from cast aluminum.

Figure 4:
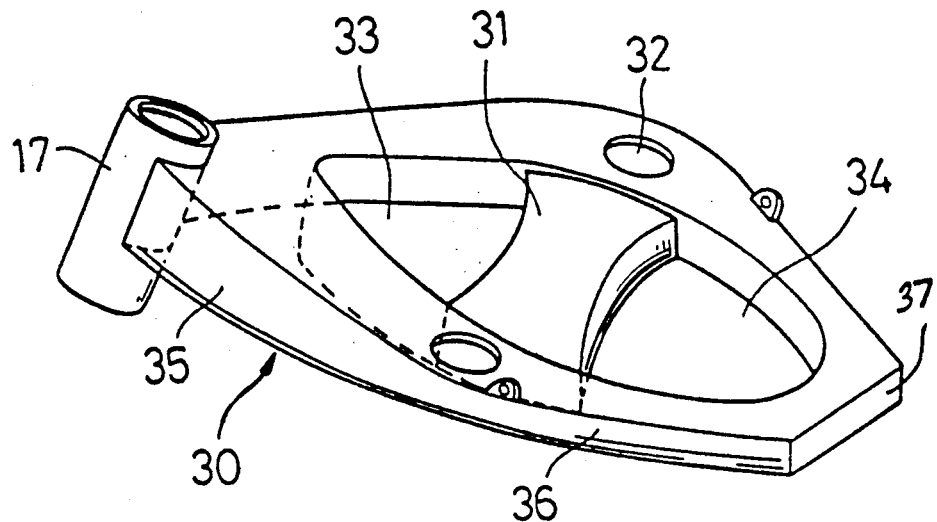
FIG. 4 is a perspective view of an upper portion of a motorcycle frame.
Figure 5:
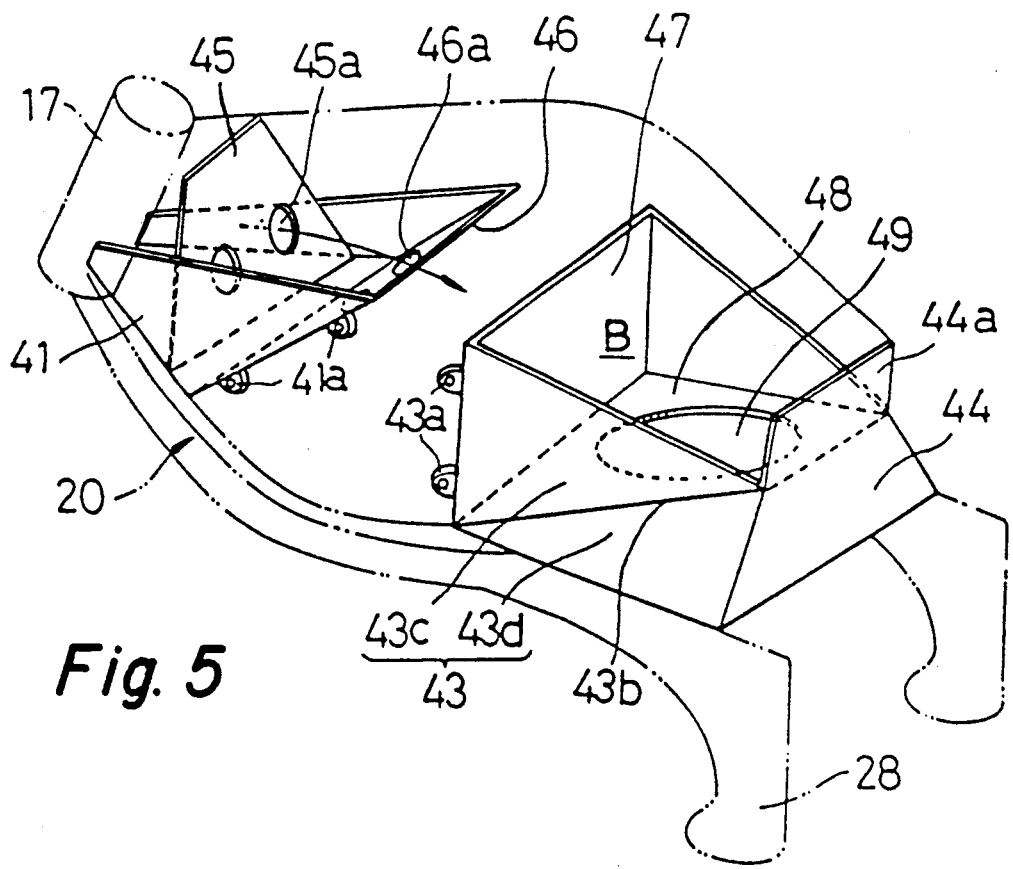
FIG. 5 is a partial phantom view of a motorcycle frame showing interior component parts thereof.

As shown in FIG. 4 an upper frame 30 extends rearwardly to avoid the interference with the forwardly inclining cylinders 13 and the intake apparatus 15 with a U-shape form from the side view. The upper frame 30 has less of a curved side portion than lower frame 20 as shown in FIG. 3. The upper frame 30 has a closed loop form in a plan view and a square pipe cross member 31 is connected transversely at the central portion thereof. Air openings 32 are formed in the frame 30 adjacent the cross member 31 and communicate with cross member 31. Cross member 31 is located at an intermediate position with respect to the right and the left upper frame 30 and forms a front space 33 in front of cross member 31 and a rear space 34 in back thereof. The rear space 34 is comparatively larger than the front space 33. A panel 40 further described below is welded to a forward side surface, a rearward side surface and a rear surface of the upper frame 30. The panel 40 consists of a substantially triangular front panel 41, a detachable air chamber lid 42, a knee panel 43, and a rear panel 44, and thus panel 40 covers the side portions between the lower frame 20 and the upper frame 30. FIG. 5 shows the installed positions of these panels. A couple of separating plates 45 and 46 are provided opening upwardly between the right and the left front panels 41 to reinforce the head pipe 17. Air passage openings 45a and 46a are provided respectively on each of the separating plates 45 and 46. The upper end of the separating plate 46 is joined to the lower portion of the front panel 41 and becomes the front separating wall of an air chamber A below the cross member 31 as shown in FIG. 2 and FIG. 5. The intake apparatus 15 is housed within air chamber A as shown in FIG. 1 and the side portion thereof is covered with the air chamber lid 42 with screw holes 42a. The air chamber lid 42 fitting portion is the inspection wall for the intake apparatus 15 within the air chamber A. In other words, the lid 42 may be removed for inspection or adjustment of the engine intake system.

Screw fitting portions 41a and 43a are projected at the rear portion of the front panel 41 and at the front portion of the knee panel 43 which correspond to each screw hole 41a of lid 42. Knee panel 43 is located near the seat S and is bent at diagonal line 43b. The upper portion 43c thereof is substantially vertical and the lower portion 43d thereof is opening outwardly. The lower connecting line is welded on the upper surface of the side line 28c of the pivot plate 28. The knee panel 43 has the bending portion to make the upper portion 43c narrow so that it can achieve the good knee grip at the knee portion N by operator M as shown with the dotted line in FIG. 1. The substantially vertical separating wall 47, which forms the rear wall of the air chamber A is built between both front ends of the right and the left knee panel 43 and the substantially trapezoidal rear panel 44 is integrally positioned between both rear ends thereof. The upper portion of the rear panel 44 has a connecting portion 44a which projects higher than the knee panel 43, and is welded to the back 37 of the upper frame 30. A pair of right and left fitting stays 19a for the seat rail 19 are welded to the rear panel 44.

A box-type resilient fuel tank housing B, described hereinafter, is formed by knee panel 43, rear panel 44 and separating wall 47. In the bottom portion of housing B a bottom plate 48 inclines rearwardly and upwardly along diagonal line 43b. A large hole 49 is formed at a central portion of bottom plate 48. The resilient tank housing B is formed in space C (see FIG. 6) which is constituted by the right and the left pivot plate 28 and the rear space of the upper frame 30. As described above, the frame body 10 is constituted of lapping of the lower frame 20 and the upper frame 30 each front end portion of which is welded to the head pipe 17, and the front panel 41, the knee panel 43, the rear panel 44 and the bottom plate 48 are welded between the side portions of the upper and the lower frames for sufficient rigidity of the frame body. The lower frame 20 can be constituted of the narrow tubes with a comparatively small section coefficient rather than the larger tubes used in the prior art, so that the side projecting portion of the curved portion 21 is narrower and the frontal area is therefore smaller.

Figure 7:
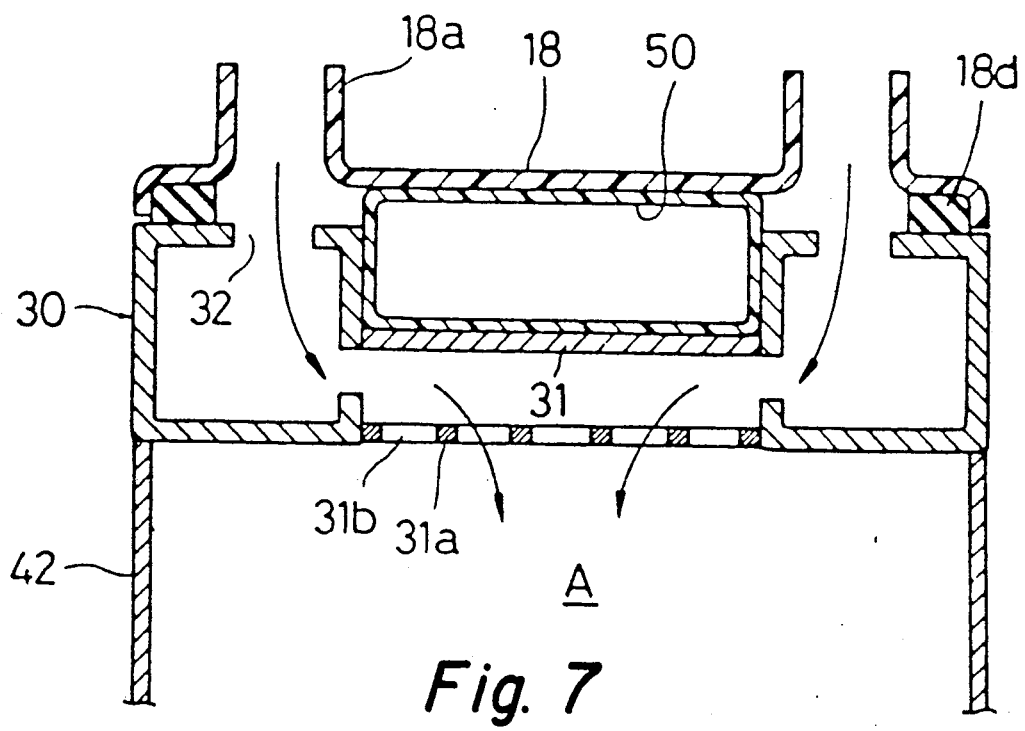
FIG. 7 is a cross-sectional view of a portion of the motorcycle frame taken along line VI—VI of FIG. 1.
Figure 8:
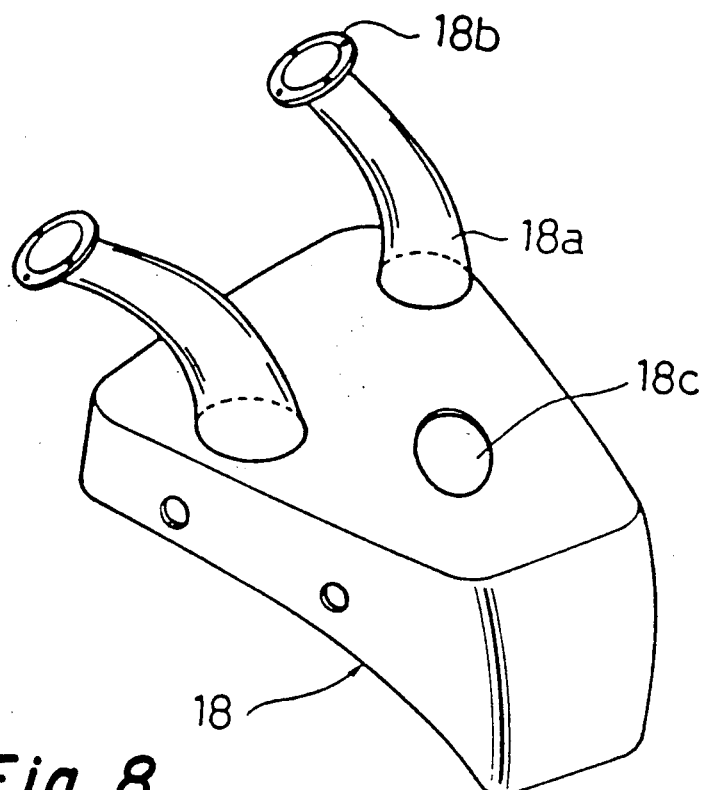
FIG. 8 is a perspective view of the fuel tank cover including the integral fairing stays.

FIG. 7 is a sectional view of the frame construction at the air chamber A. The right an left upper frames 30 communicate with cross member 31. Plural air holes 31b are formed at the bottom portion 31a of cross member 31. A resilient tank 50 is supported on the upper surface of the upper frame 30 and the upper portion there of is covered with the tank cover 18. The tank cover 28 maintains a fixed outward form of resilient tank 50, and is made of a rigid plastic material. The outward form of the tank cover 18 is shown in FIG. 8, in which the upwardly projecting hollow fairing stays 18a are integrally formed at the corresponding portion of the air holes 31 of upper frame 30. The fairing stays 18a also function as air ducts. Flanges 18b at the front end portions of stays 18a are connected to openings 18e in fairing F as shown in FIG. 1, in order to support fairing F and communicate with the atmosphere. The other end thereof communicates with the interior space of the tank cover 18.

Numeral 18c is a hole for fuel supply and corresponds with a fuel cap 50a. As shown in FIG. 7 the sealing element 18d is provided between the tank cover 18 and the upper frame 30. Air is conducted through openings 18e of fairing F, the fairing stay 19a, the air hole 32, the cross member 31, the air holes 31b and into the air chamber A.

Figure 9:
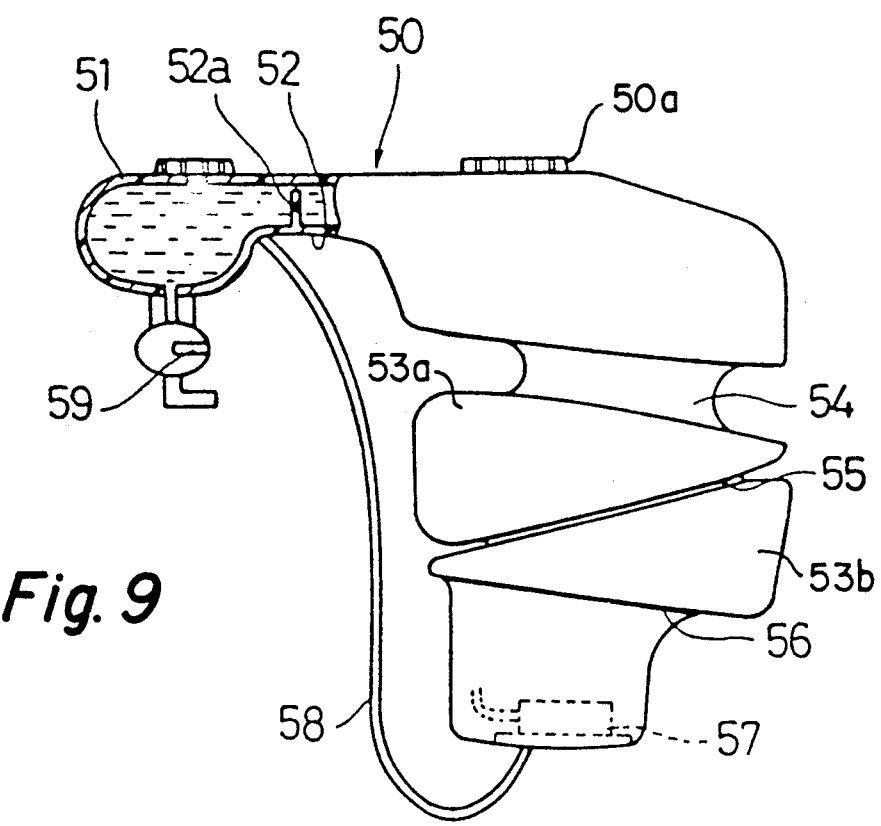
FIG. 9 is a partially cross-sectioned side view of the fuel tank.
Figure 10:
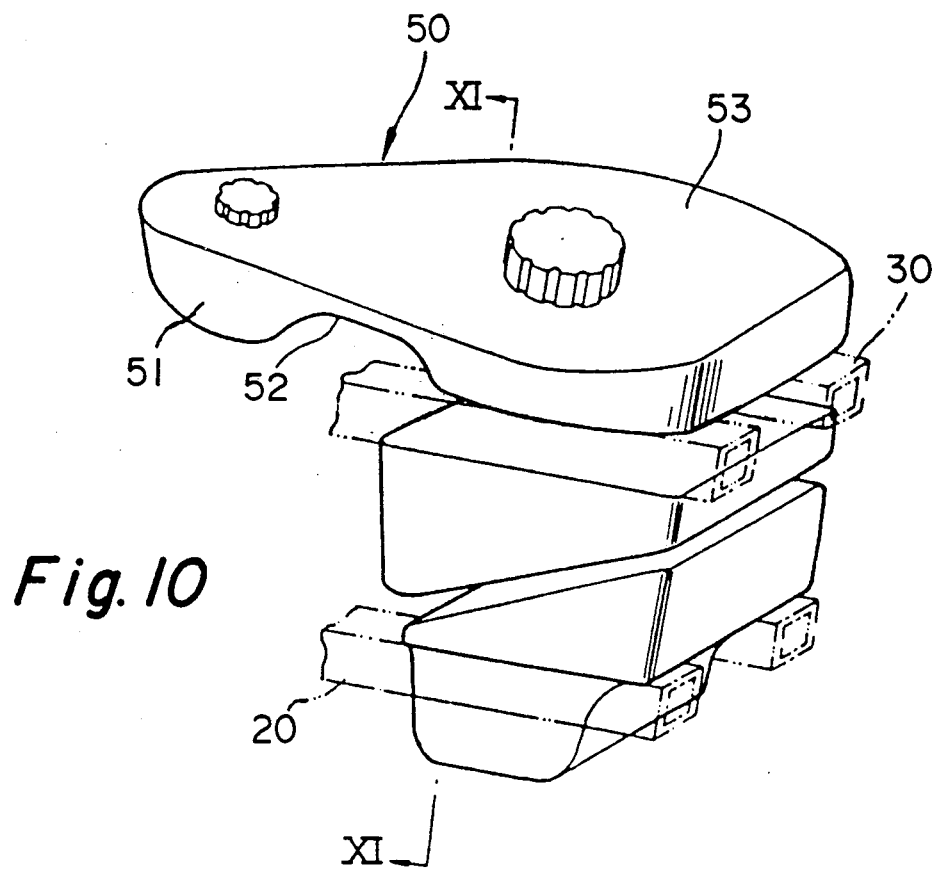
FIG. 10 is a perspective view of the fuel tank of FIG. 9, with frame support members shown in phantom.
Figure 11:
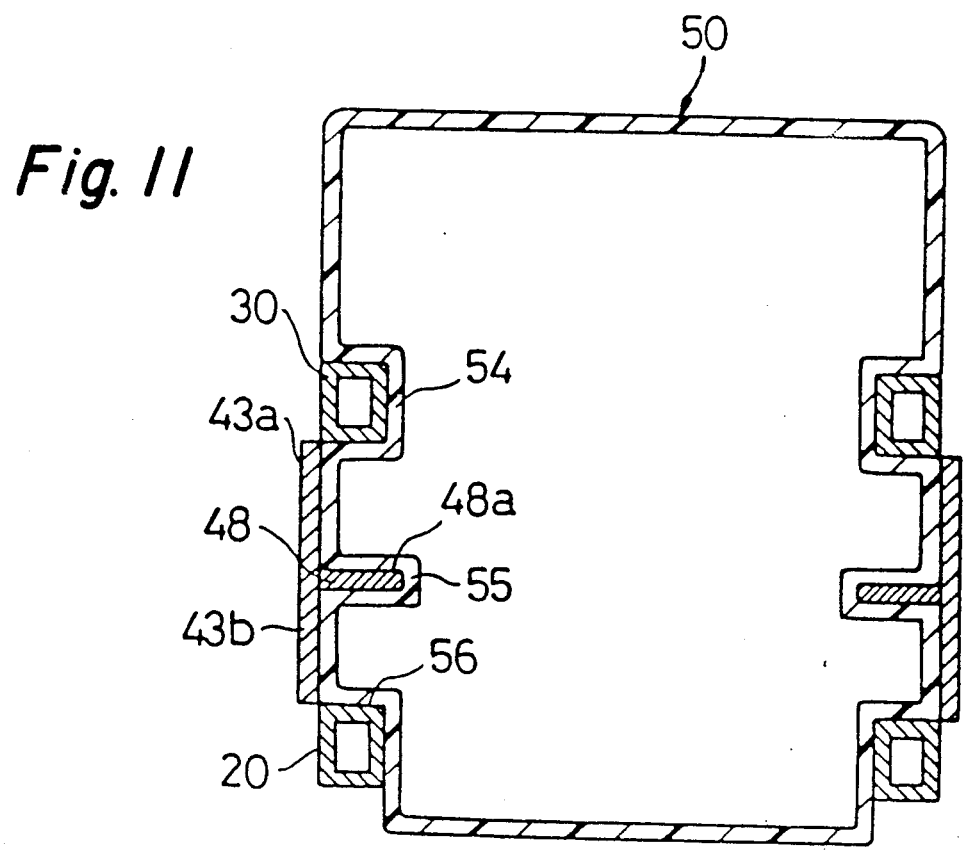
FIG. 11 is a cross-sectional view of the fuel tank of FIG. 10 taken along line XI—XI.

FIG. 9 to FIG. 11 show the installed position of the resilient fuel tank 50. The resilient tank 50 is made of a resilient deformable material such as rubber which is hollow and can change its form according to the quantity of fluid therein. Tank 50 consists of a front room 41 with a comparatively small volume and a rear room 53 with a larger volume which communicates with the front room through a joint portion 52 with an upwardly extending barrier 52a. The rear room 53 can be housed within the space at the rear portion of the frame body 10. A first lower section 53a of rear room 53 is housed within the resilient tank housing B and a second lower section 53b of rear room 53 is supported hanging downwardly into space C between the right and the left pivot 28 through the opening 49 of the bottom plate 48, as shown in FIG. 1 and FIG. 6. As shown in FIG. 9 and FIG. 10 the rear room 53 has a first throat portion 54 and a second throat portion 55 at the position where the upper frame 30 and the bottom plate 48 come across. A step portion 56 is formed in the tank at the position where lower frame 20 comes across. The throat portion 55 inclines in the opposite direction to the throat portion 54 and the step portion 56. When the resilient tank 50 is put on the upper frame 30 shown in FIG. 2 and FIG. 3 and the rear room 53 is put into the rear space 34, the step portion 56 of the bottom portion passing through the open 49 is supported on the lower frame 20. The middle portion or first lower section 53a of the rear room 53 is supported by the circumference portion 48a of bottom plate 48, where throat portion 55 is inserted into opening 49. The upper portion of the rear room 53 is supported by upper frame 30. Throat portion 54 is inserted into upper frame 30. As the joint portion 52 is located on the cross member as shown in FIG. 7, the front room 51 and the rear room 42 are separately supported by the cross member 31. Therefore, the resilient tank 50, whose form is flexible, is securely supported by a plurality of supporting members including the cross member 31, the upper frame 30, the bottom plate 48 and the lower frame 20. Numeral 57 in FIG. 9 is a fuel pump provided in the inside of the bottom portion of the rear room 53. Fuel is sent from the fuel pump to the front room 51 through the pipe 58. Further, fuel is supplied to the forwardly inclining cylinder 13 through the fuel cock 59 and the intake apparatus 15. Barrier 52a is a separating wall to prevent overflow between rooms 51 and 53. Because the tank 50 is formed from flexible material of the tank 50, the numerous supports are required as shown in FIGS. 7-11.

Figure 12:
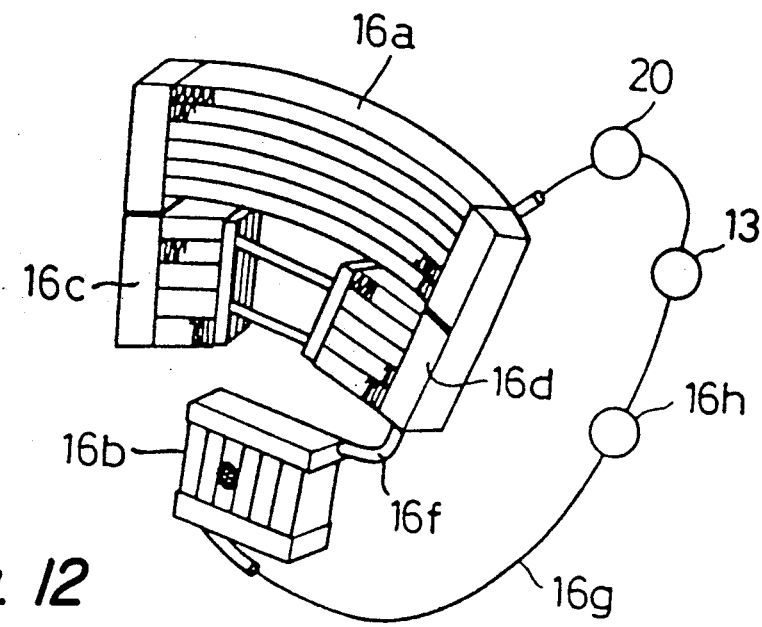
FIG. 12 is a partially schematic view of a coolant radiator and an oil cooler and the coolant connections thereto.
Figure 13:
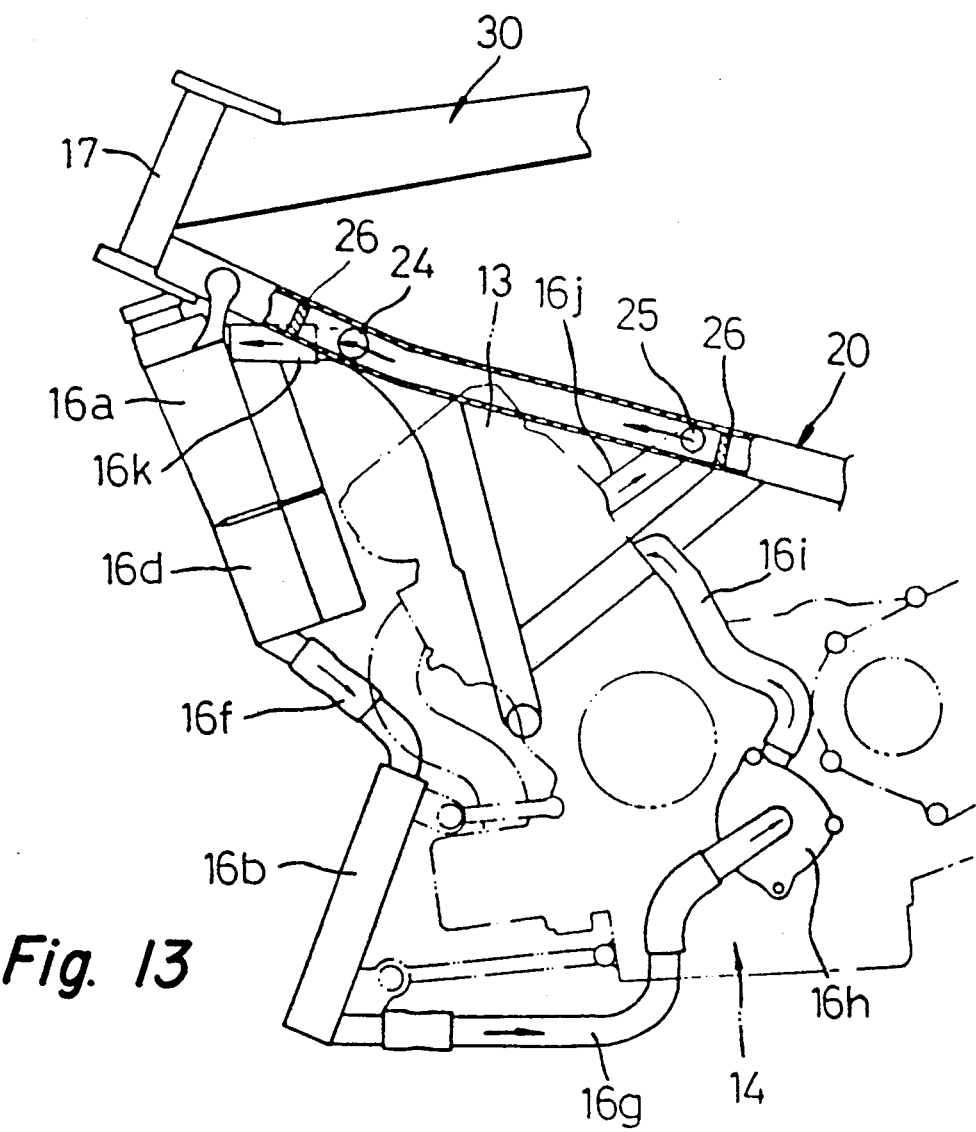
FIG. 13 is a partially cross-sectioned view of the radiator and oil cooler of FIG. 12 and their relationship to the motorcycle frame.

FIGS. 12 and 13 illustrate in detail how the frame also operates as a coolant passage. A main radiator 16a and an auxiliary radiator 16b form part of a coolant circuit along with passage 16g, coolant pump 16h, hose 16i, lower frame pipe 20, hose 16k and back into radiator 16. Use of the frame 20 as a coolant passage allows the reduction in the amount and length of coolant hoses needed. This improves the appearance of the motorcycle and reduces the number of hoses needed.

Figure 14:
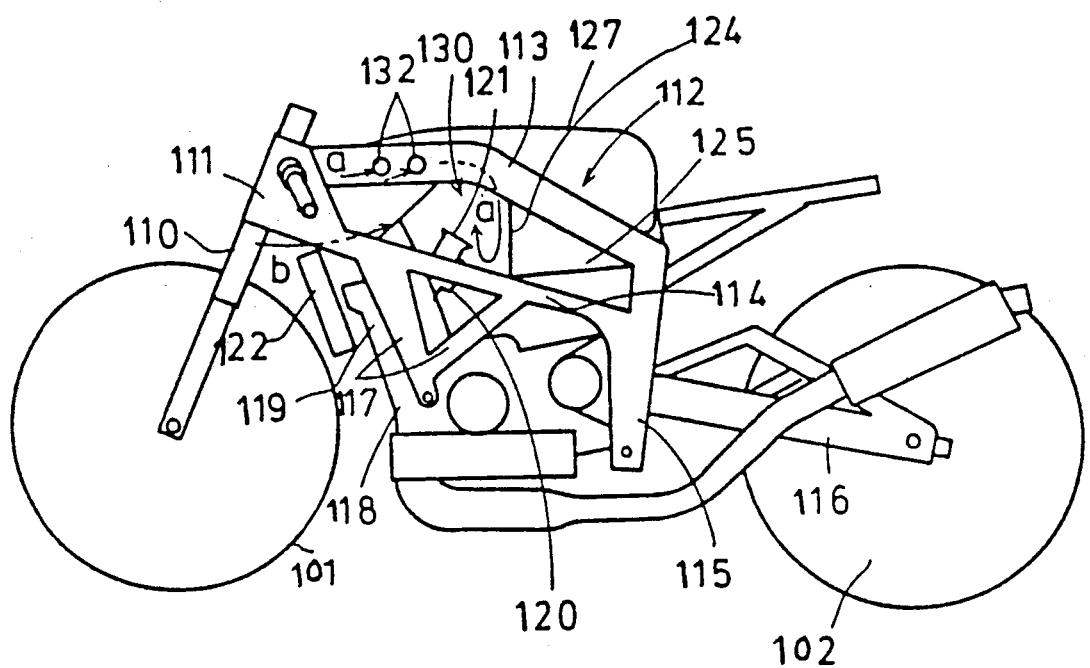
FIG. 14 is a diagrammatical side view of a motorcycle illustrating air flow to the engine air intake.
Figure 15:
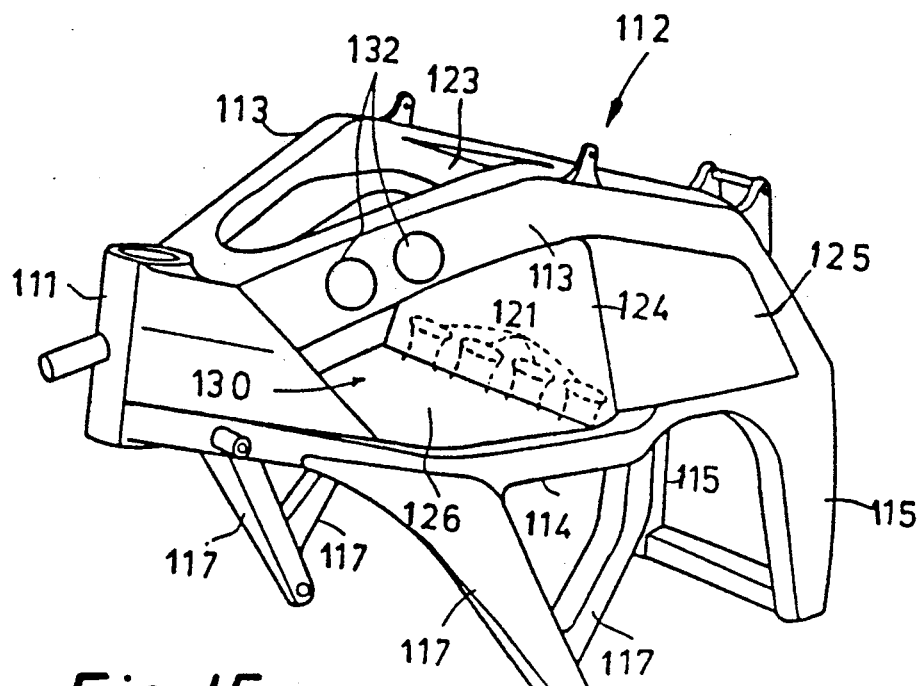
FIG. 15 is a perspective view of another embodiment of a motorcycle frame.
Figure 16:
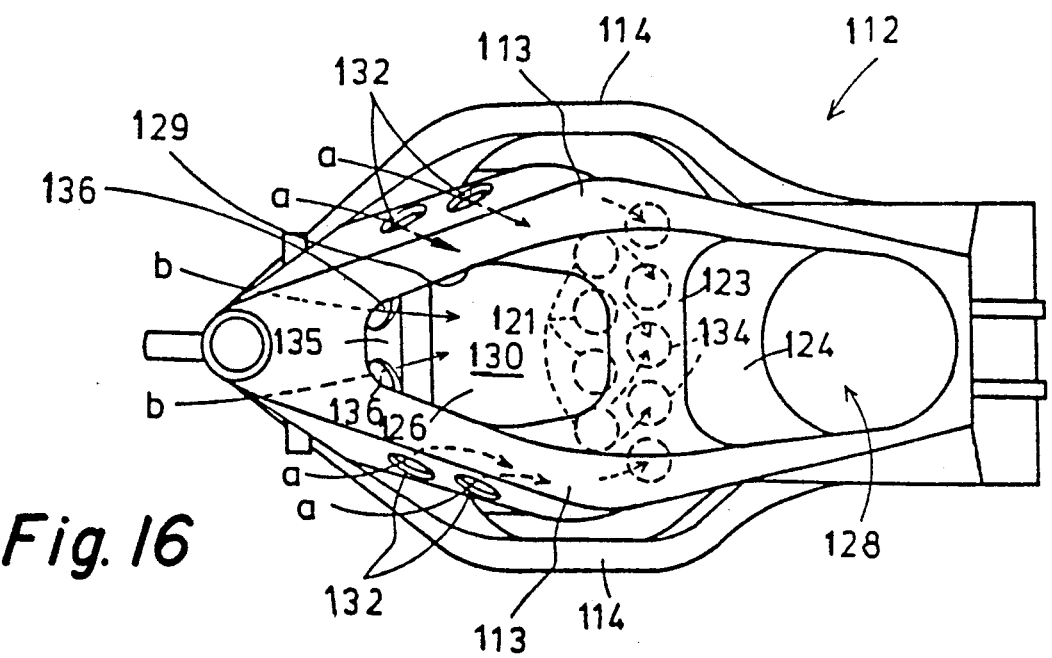
FIG. 16 is a top view of the motorcycle frame of FIG. 15.

FIGS. 14-16 illustrate a further embodiment of the invention. In the motorcycle of FIG. 14, wheels 101 and 102 are suspended from a frame 112. The frame 112 has an upper frame 113 and a lower frame 114. The upper and lower frames 113 and 114 are joined together at head pipe 111. Head pipe 111 is connected to wheel 101 through fork 110. Rear wheel 102 is connected to the frame by way of rear swing arm 116. Down pipes 117 form a triangular support from which the engine 118 is mounted. Cylinders 119 are inclined forwardly and are fed by carburetor 120 having an induction device 121 thereon. A pair of pivot plates 115 extend downwardly from the rear portion of frame 112. Air passage holes 132 are formed on the outsides of the upper portion 113 of frame 112. Air flows into passage holes 132, and through the frame, and into an air chamber 130. A radiator 122 is positioned in front of the engine. As also seen in FIGS. 15 and 16, air flowing through air passages 132 through the upper frame 113, through cross member 12 and exiting out of holes 134 on the bottom of cross member 123 provide air directly to the intake devices 121 of the engine. This air passage is represented by the arrows a. Arrows b represent the passage of air directly from the front of the motorcycle which pass through openings 136 formed in wall 135. A rear wall 124 is formed on the back of air chamber 130. Side panels 125 are formed on both sides of the frame 112. Additionally, an opening 128 is provided in the rear portion of frame 112 for the positioning of a resilient fuel tank therein. Mounting points 129 are also provided on frame 112. The advantage of this system is that air entering chamber 130 is fresh air and has not passed over the engine, and thus does not contain engine heat. Further, with the multiple holes 134 on the bottom of cross member 123, air can be conducted into chamber 130 evenly in order to make engine operation more efficient.

Although specific forms of embodiments of the invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is determined by the following claims.

I claim:

1. A frame for a motorcycle having a transverse in-line engine, comprising:

a headpipe for supporting a front wheel;

a pivot section for supporting a swing arm for a rear wheel;

a lower frame passing along sides of said engine and extending downwardly from said headpipe to said pivot section, said lower frame including a pair of laterally spaced frame sections, one on each side of said engine; and an upper frame extending from said headpipe to an area near a front end of a motorcycle seat and passing over said engine, said upper frame including a pair of laterally spaced frame sections, corresponding to said lower frame laterally spaced frame sections, wherein said upper and lower frames are connected together at rear end portion thereof;

wherein said upper and lower laterally spaced frame sections are joined together by a generally vertical right side plate on one side of said motorcycle and generally vertical left side plate on the other side of said motorcycle to form laterally spaced right and left frames extending outward from said head pipe, each having a hollow interior; and a hollow cross-member connecting said right and left frames together at an intermediate portion thereof, wherein the hollow interior of said cross member communicates with the hollow interiors of said frames;

intake openings disposed on said right and left frames on portions thereof extending laterally beyond said headpipe, said portions located in front of said cross member, for feeding air into said right and left frames;

an exhaust opening formed on the bottom of said cross-member for exhausting said air downward.

2. The frame of claim 1, wherein said plates extend from the headpipe to the rear end portion of said upper frame.

3. The frame of claim 1, wherein said plates connect forward portions of said upper and lower frames.

4. The frame of claim 1, wherein said plates connect rear portions of said upper and lower frames.

5. A frame for a motorcycle having a transverse in-line engine, comprising:

a headpipe for supporting a front wheel;

a pivot section for supporting a swing arm for a rear wheel;

a lower frame passing along sides of said engine and extending downwardly from said headpipe to said pivot section, said lower frame including a pair of laterally spaced frame sections, one on each side of said engine; and an upper frame extending from said headpipe to an area near a front end of a motorcycle seat and passing over said engine, said upper frame including a pair of laterally spaced frame sections, corresponding to said lower frame laterally spaced frame sections, wherein said upper and lower frames are connected together at rear end portions thereof, and wherein said upper and lower laterally spaced frames sections are joined together by a generally vertical right side plate on one side of said motorcycle and a generally vertical left side plate on the other side of said motorcycle, wherein said plates extend from the headpipe to the rear end portion of the upper frame, and wherein each of said plates includes a removable plate at an intermediate portion thereof, said removable plates being positioned on both sides of an air chamber formed inside of said frame.

6. An air intake structure for a motorcycle, comprising:

a pair of hollow, laterally spaced right and left frames extending outward from a headpipe and to a rear portion of the motorcycle, such that portions of said right and left frames extend laterally beyond said headpipe;

a hollow cross-member connecting said frames together at an intermediate portion thereof, wherein the hollow interior of said cross member communicates with the hollow interiors of said frames;

intake openings disposed on said right and left frames on said portions thereof extending laterally beyond said portions located in front of said cross member, for feeding air into said frames;

an exhaust opening formed on the bottom of said cross-member for exhausting said air downward.

7. The air intake structure of claim 6, further including a plurality of exhaust openings formed on the bottom of said cross-member for exhausting air downward into an air chamber containing engine air intakes.

8. The air intake structure of claim 6, wherein said intake openings are formed on top of said frames.

9. The air intake structure of claim 6, wherein said intake openings are formed on the sides of said frames.

10. An air intake structure for a motorcycle, comprising:

a pair of hollow, laterally spaced frames extending from a headpipe to a rear portion of the motorcycle;

a hollow cross-member connecting said frames together at an intermediate portion thereof, wherein the hollow interior of said cross member communicates with the hollow interiors of said frames;

intake openings disposed at a front portion of said frames for feeding air into said frames;

a plurality of exhaust openings formed on the bottom of said cross-member for exhausting said air downward, into an air chamber containing engine air intakes; and wherein said air chamber is formed between a front plate connected to a forward edge of the cross-member and extending downward at an angle inclined forwardly and a rear plate connected to a rear edge of the cross-member and extending downward therefrom.

11. The air intake structure of claim 10, further comprising a forward plate formed between said hollow frames at a position forward of said front plate.

12. The air intake structure of claim 11, further comprising means for conducting air from the front of the motorcycle, through said forward and front plates to said air chamber.

13. An air intake structure for a motorcycle, comprising:

a pair of hollow, laterally spaced frames extending from a headpipe to a rear portion of the motorcycle;

a hollow cross-member connecting said frames together at an intermediate portion thereof, wherein the hollow interior of said cross member communicates with the hollow interiors of said frames;

intake openings disposed at a front portion of said frames for feeding air into said frames;

an exhaust opening formed on the bottom of said cross-member for exhausting said air downward, and a box member fixed between said frames and behind said cross-member for supporting a flexible fuel tank therein.

14. An air intake structure for a motorcycle, comprising:

a pair of hollow, laterally spaced frames extending from a headpipe to a rear portion of the motorcycle;

a hollow cross-member connecting said frames together at an intermediate portion thereof, wherein the hollow interior of said cross member communicates with the hollow interiors of said frames;

intake openings disposed at a front portion of said frames for feeding air into said frames;

an exhaust opening formed on the bottom of said cross-member for exhausting said air downward, and a cover, covering said frames, said cover integrally including hollow fairing stays extending therefrom for supporting a motorcycle fairing, wherein said hollow fairing stays duct air from intake ports on said fairing to said intake openings on said frames.

* * * * *